(12) United States Patent
Takasugi

(10) Patent No.: US 11,584,999 B2
(45) Date of Patent: Feb. 21, 2023

(54) ELECTROCHEMICAL HYDROGEN COMPRESSOR

(71) Applicant: HONDA MOTOR CO., LTD., Tokyo (JP)

(72) Inventor: Shoji Takasugi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/681,799

(22) Filed: Feb. 27, 2022

(65) Prior Publication Data
US 2022/0307142 A1 Sep. 29, 2022

(30) Foreign Application Priority Data

Mar. 29, 2021 (JP) .............................. JP2021-054523

(51) Int. Cl.
| | |
|---|---|
| *C25B 9/00* | (2021.01) |
| *C25B 1/04* | (2021.01) |
| *C25B 9/60* | (2021.01) |
| *C25B 9/19* | (2021.01) |
| *C25B 13/08* | (2006.01) |

(52) U.S. Cl.
CPC .................. *C25B 1/04* (2013.01); *C25B 9/19* (2021.01); *C25B 9/60* (2021.01); *C25B 13/08* (2013.01)

(58) Field of Classification Search
CPC .... C25B 1/04; C25B 9/60; C25B 9/19; C25B 13/08
See application file for complete search history.

(56) References Cited

U.S. PATENT DOCUMENTS

| | | | |
|---|---|---|---|
| 2016/0122885 A1 | 5/2016 | Ishikawa et al. | |
| 2020/0340457 A1 | 10/2020 | Ukai et al. | |
| 2021/0197120 A1* | 7/2021 | Kani | ........................ H01M 8/04 |

FOREIGN PATENT DOCUMENTS

| | | |
|---|---|---|
| JP | 2016-089220 A | 5/2016 |
| JP | 2020-094270 A | 6/2020 |

\* cited by examiner

*Primary Examiner* — Zulmariam Mendez
(74) *Attorney, Agent, or Firm* — Carrier Shende & Associates, P.C.; Joseph P. Carrier; Fulchand P. Shende

(57) ABSTRACT

An electrochemical cell of an electrochemical hydrogen compressor is provided with a first flow field member having a hydrogen gas flow field and a second flow field member having a water channel. The first flow field member is located between the anode electrode and the anode separator. The second flow field member is located between the anode electrode and the first flow field member. A first porous member is located between the first flow field member and the second flow field member. A second porous member is located between the second flow field member and the anode electrode.

7 Claims, 4 Drawing Sheets

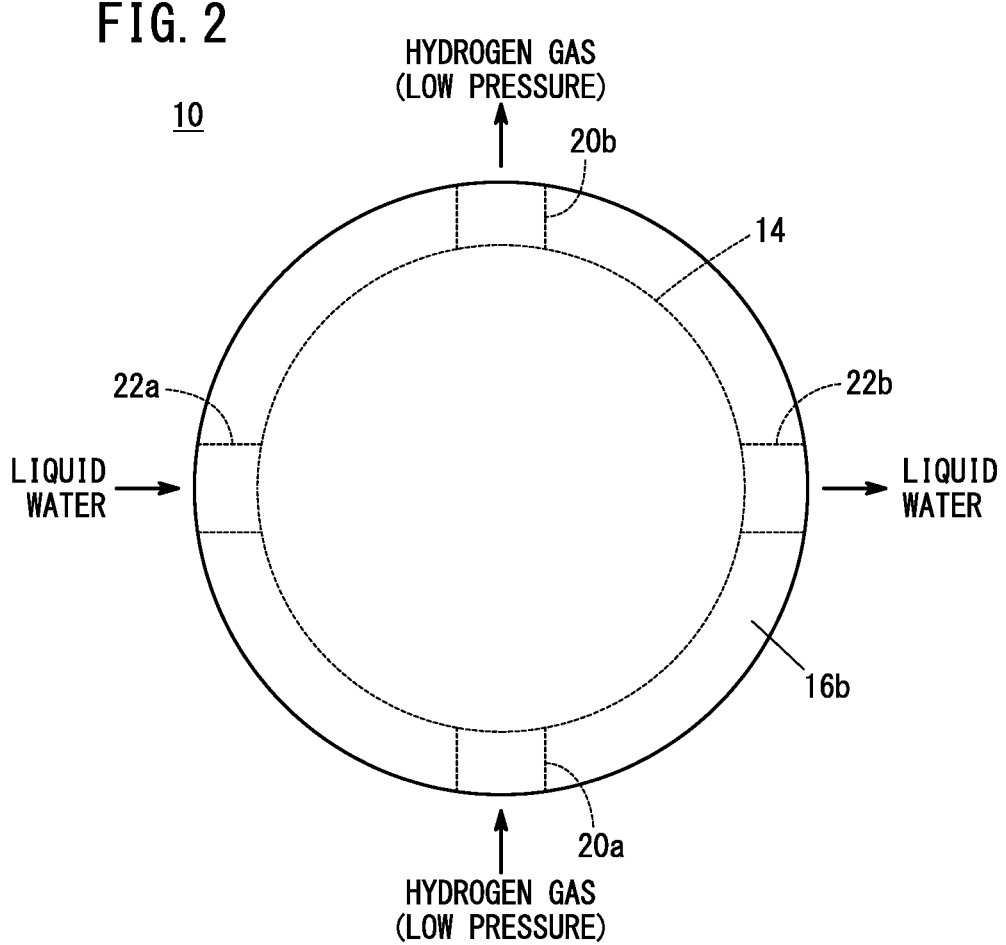

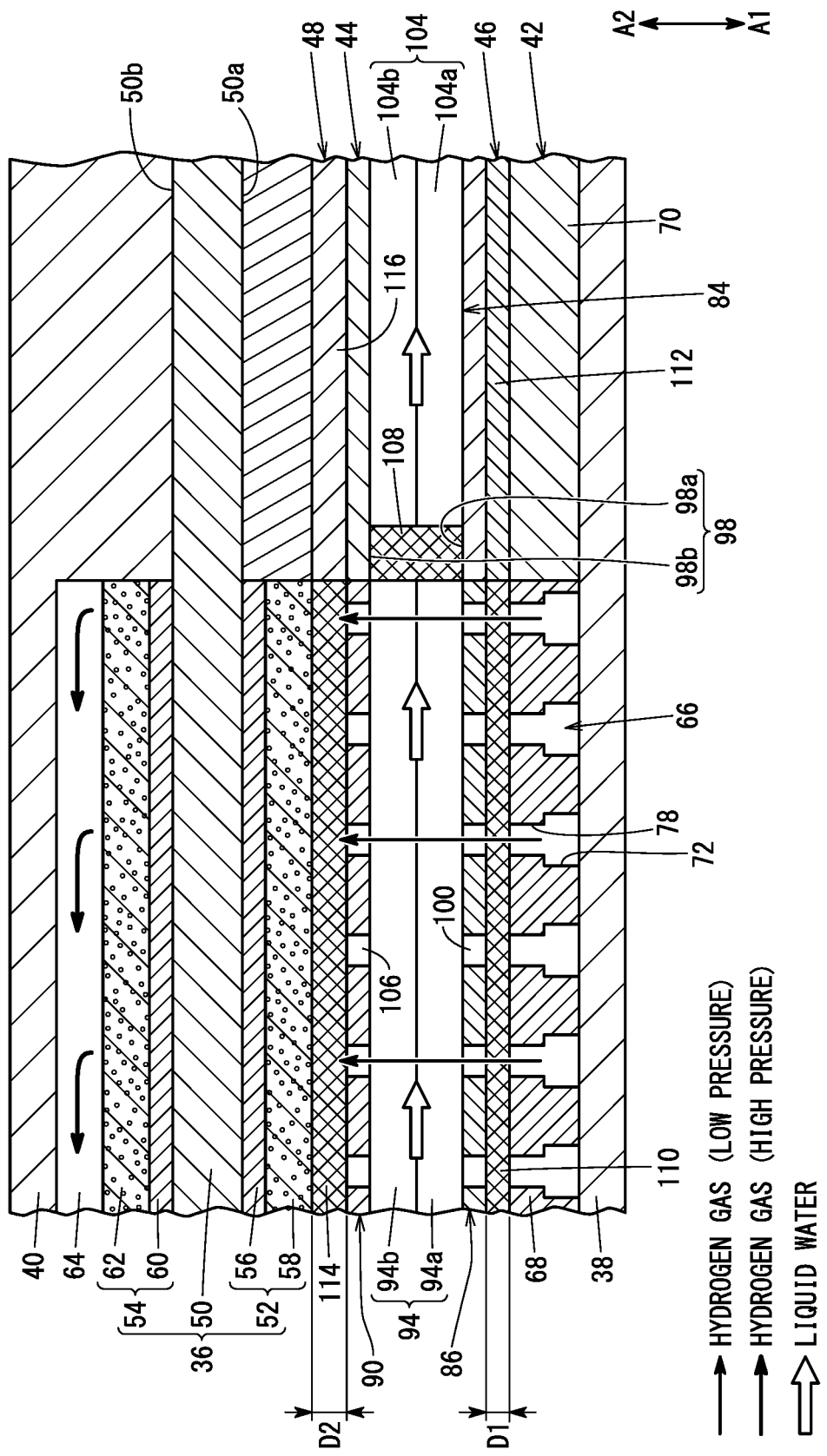

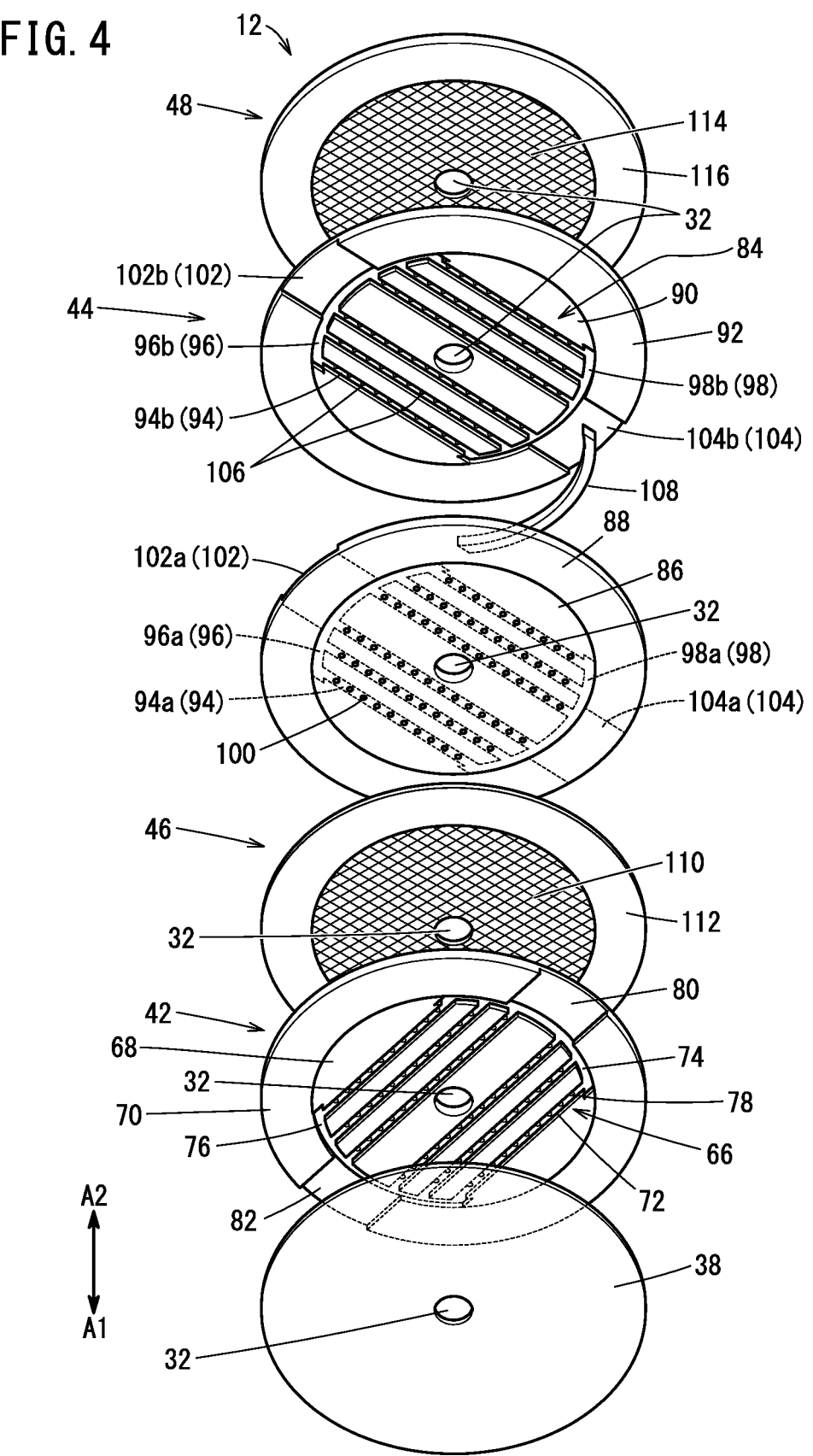

ELECTROCHEMICAL HYDROGEN COMPRESSOR

CROSS-REFERENCE TO RELATED APPLICATIONS

This application is based upon and claims the benefit of priority from Japanese Patent Application No. 2021-054523 filed on Mar. 29, 2021, the contents of which are incorporated herein by reference.

BACKGROUND OF THE INVENTION

Field of the Invention

The present invention relates to an electrochemical hydrogen compressor.

Description of the Related Art

For example, JP 2016-089220 A discloses a differential pressure type high-pressure water electrolysis apparatus that electrolyzes water and generates high-pressure hydrogen. The differential pressure type high-pressure water electrolysis apparatus includes an electrochemical cell. The electrochemical cell has a membrane electrode assembly, an anode separator, and a cathode separator. The membrane electrode assembly includes an electrolyte membrane, an anode electrode disposed on one surface of the electrolyte membrane, and a cathode electrode disposed on the other surface of the electrolyte membrane. The membrane electrode assembly is disposed between the anode separator and the cathode separator.

This type of electrochemical cell is also used as an electrochemical hydrogen compressor. In the electrochemical hydrogen compressor, hydrogen gas is supplied to the anode electrode. Hydrogen ions (protons) in the hydrogen gas move to the cathode electrode through the electrolyte membrane. High-pressure hydrogen gas is generated at the cathode electrode.

SUMMARY OF THE INVENTION

In the electrochemical hydrogen compressor, an electrolyte membrane needs to contain a certain amount of water in order to prevent an increase in resistance. Therefore, hydrogen gas to which water (water vapor) has been added by a humidifier such as a bubbler is introduced into the electrochemical hydrogen compressor through a pipe. However, when water in the hydrogen gas flowing through the pipe is condensed on the pipe, the electrolyte membrane tends to dry.

An object of the present invention is to solve the aforementioned problem.

An electrochemical hydrogen compressor comprising an electrochemical cell including a membrane electrode assembly including an electrolyte membrane capable of conducting a hydrogen ion, and an anode electrode and a cathode electrode sandwiching the electrolyte membrane, and an anode separator and a cathode separator arranged on both sides of the membrane electrode assembly, wherein hydrogen gas supplied to the anode electrode is pressurized electrochemically to generate at the cathode electrode hydrogen gas having a higher pressure than the hydrogen gas, the electrochemical cell including: a first flow field member that is located between the anode electrode and the anode separator and includes a hydrogen gas flow field that guides the hydrogen gas to the anode electrode; a second flow field member that is located between the anode electrode and the first flow field member and includes a water channel through which liquid water for humidifying the hydrogen gas and cooling the electrolyte membrane flows; a first porous member that is located between the first flow field member and the second flow field member; and a second porous member that is located between the second flow field member and the anode electrode, wherein the first porous member permits flow of the hydrogen gas from the hydrogen gas flow field to the water channel and prevents flow of the liquid water, and wherein the second porous member permits flow of the hydrogen gas and water vapor from the water channel and prevents flow of the liquid water.

According to the present invention, the hydrogen gas supplied to the hydrogen gas flow field of the electrochemical cell is carried into the water channel through the first porous member and humidified by liquid water flowing through the water channel. The humidified hydrogen gas (hydrogen gas containing water vapor) is led to the anode electrode through the second porous member and humidifies the electrolyte membrane. That is, the hydrogen gas is humidified inside the electrochemical cell. Therefore, it is possible to suppress drying of the electrolyte membrane caused by condensation (lack of moisture) in the pipe arranged outside the electrochemical hydrogen compressor.

In addition, the electrolyte membrane generating heat during operation of the electrochemical cell can be cooled by liquid water of the water channel. Therefore, it is possible to prevent the temperature of the electrolyte membrane from becoming excessively high and the electrolyte membrane from drying. Further, as the temperature of the electrolyte membrane increases, the temperature of the liquid water increases and the amount of evaporation (amount of water vapor) increases. Thus, it is possible to effectively suppress drying of the electrolyte membrane.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 2 is a plan view showing the electrochemical hydrogen compressor of FIG. 1 as viewed from the stacking direction.

FIG. 3 is a partially omitted cross-sectional view of an electrochemical cell of the electrochemical hydrogen compressor.

FIG. 4 is a partially omitted exploded perspective view of the electrochemical cell of FIG. 3.

DESCRIPTION OF THE INVENTION

Figure 1:
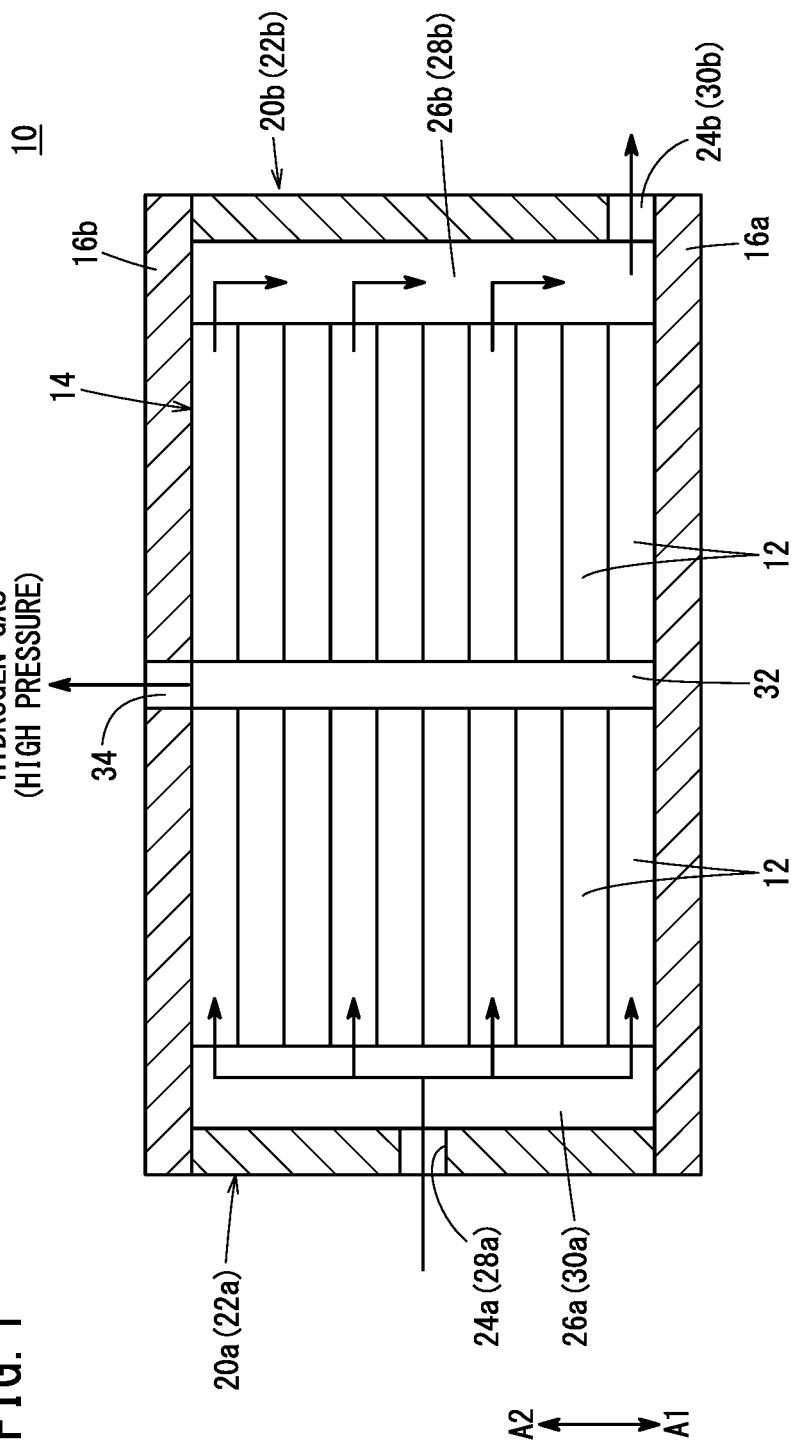
FIG. 1 is a schematic configuration diagram of an electrochemical hydrogen compressor according to an embodiment of the present invention.

As shown in FIGS. 1 and 2, an electrochemical hydrogen compressor 10 according to an embodiment of the present invention is a booster that electrochemically boosts low-pressure hydrogen gas supplied from a hydrogen tank or the like (not shown) via an external pipe to high-pressure hydrogen gas.

An electrochemical hydrogen compressor 10 includes a cell stack 14, a first end plate 16a, and a second end plate 16b. In the cell stack 14, a plurality of electrochemical cells 12 are stacked in the thickness direction. The first end plate 16a is located at one end of the cell stack 14. The second end plate 16b is located at the other end of the cell stack 14. The first end plate 16a and the second end plate 16b are fastened by a plurality of bolts (not shown). Thus, a clamping load is applied to the cell stack 14 by the first end plate 16a and the second end plate 16b. A power supply device (not shown) for supplying electricity to each electrochemical cell 12 is connected to the cell stack 14.

The cell stack 14, the first end plate 16a, and the second end plate 16b are formed in a circular shape when viewed from the stacking direction of the plurality of electrochemical cells 12 (see FIG. 2). A hydrogen gas inlet section 20a, a hydrogen gas outlet section 20b, a water inlet portion 22a, and a water outlet portion 22b are provided on the sides of the cell stack 14.

The hydrogen gas inlet portion 20a has a hydrogen gas inlet port 24a and a hydrogen gas distribution flow field 26a. Hydrogen gas is introduced into the hydrogen gas inlet port 24a from an external pipe (not shown). The hydrogen gas distribution flow field 26a distributes hydrogen gas introduced from the hydrogen gas inlet port 24a to each electrochemical cell 12. The hydrogen gas outlet portion 20b has a hydrogen gas collection flow field 26b and a hydrogen gas outlet port 24b. The hydrogen gas (unreacted hydrogen gas) of each electrochemical cell 12 is introduced into the hydrogen gas collection flow field 26b. The hydrogen gas outlet port 24b leads the hydrogen gas in the hydrogen gas collection flow field 26b to an external pipe (not shown). The hydrogen gas inlet portion 20a is located at a position shifted from the hydrogen gas outlet portion 20b by 180° in the circumferential direction of the cell stack 14.

The water inlet portion 22a has a water inlet port 28a and a water distribution flow field 30a. Liquid water is introduced into the water inlet port 28a from an external pipe (not shown). The water distribution flow field 30a distributes the liquid water led from the water inlet port 28a to each electrochemical cell 12. The water outlet portion 22b has a water collection flow field 30b and a water outlet port 28b. Liquid water flowing through each electrochemical cell 12 is led out to the water collection flow field 30b. The water outlet port 28b leads out the liquid water in the water collection flow field 30b to an external pipe (not shown). The water inlet portion 22a is located at a position shifted from the water outlet portion 22b by 180° in the circumferential direction of the cell stack 14. Specifically, the hydrogen gas inlet portion 20a, the hydrogen gas outlet portion 20b, the water inlet portion 22a, and the water outlet portion 22b are arranged with their positions shifted by 90° in the circumferential direction of the cell stack 14 (see FIG. 2).

A central portion of each electrochemical cell 12 has a hydrogen gas passage 32 for discharging high-pressure hydrogen gas generated in each electrochemical cell 12 (see FIG. 1). A central portion of the second end plate 16b has a carrying-out port 34 communicating with the hydrogen gas passage 32.

As shown in FIG. 3, the electrochemical cell 12 includes a membrane electrode assembly (hereinafter referred to as MEA 36), an anode separator 38, a cathode separator 40, a first flow field member 42, a second flow field member 44, a first intermediate member 46, and a second intermediate member 48. The MEA 36 has an electrolyte membrane 50, an anode electrode 52, and a cathode electrode 54. The anode electrode 52 is disposed on one surface 50a of the electrolyte membrane 50. The cathode electrode 54 is disposed on the other surface 50b of the electrolyte membrane 50. The MEA 36 electrochemically raises the pressure of the hydrogen gas supplied to the anode electrode 52, thereby generating high-pressure hydrogen gas at the cathode electrode 54.

The electrolyte membrane 50 is capable of conducting hydrogen ions (protons). The electrolyte membrane 50 is, for example, a solid polymer electrolyte membrane (cation exchange membrane). The solid polymer electrolyte membrane is, for example, a thin membrane of perfluorosulfonic acid with water. The electrolyte membrane 50 is sandwiched between the anode electrode 52 and the cathode electrode 54. The electrolyte membrane 50 may be a fluorine-based electrolyte or an HC (hydrocarbon)-based electrolyte.

The anode electrode 52 includes an anode electrode catalyst layer 56 and an anode current collector 58. The anode electrode catalyst layer 56 is connected to one surface 50a of the electrolyte membrane 50. The anode current collector 58 is stacked on the anode electrode catalyst layer 56. The anode electrode catalyst layer 56 includes, for example, a carbon porous body supporting catalyst particles such as platinum. The anode current collector 58 also serves as a gas diffusion layer for supplying hydrogen gas to the anode electrode catalyst layer 56.

The cathode electrode 54 includes a cathode electrode catalyst layer 60 and a cathode current collector 62. The cathode electrode catalyst layer 60 is connected to the other surface 50b of the electrolyte membrane 50. The cathode current collector 62 is stacked on the cathode electrode catalyst layer 60. The cathode electrode catalyst layer 60 is formed in the same manner as the anode electrode catalyst layer 56, for example. The cathode current collector 62 also serves as a gas diffusion layer for discharging high-pressure hydrogen gas generated in the cathode electrode catalyst layer 60 into a carrying-out flow field 64 to be described later.

The anode separator 38 is disposed on one surface of the MEA 36. The cathode separator 40 is disposed on the other surface of the MEA 36. The anode separator 38 and the cathode separator 40 are formed by press-molding a metal plate. The metal plate may be, for example, a steel plate, a stainless steel plate, an aluminum plate, or a plated steel plate. The metal plate may be a stainless steel plate whose surface is surface-treated for corrosion prevention or an aluminum plate whose surface is surface-treated for corrosion prevention. The anode separator 38 and the cathode separator 40 may be formed of a carbon member or the like.

A central portion of the anode separator 38 has a hydrogen gas passage 32 (see FIG. 4). Although not shown in detail, the MEA 36 and the cathode separator 40 are also formed with the hydrogen gas passages 32. A surface of the cathode separator 40 facing the MEA 36 has a carrying-out flow field 64. The carrying-out flow field 64 guides high-pressure hydrogen gas generated at the cathode electrode 54 to the hydrogen gas passage 32.

As shown in FIGS. 3 and 4, the first flow field member 42 has hydrogen gas flow fields 66. The hydrogen gas flow fields 66 are located between the anode electrode 52 and the anode separator 38. The hydrogen gas flow fields 66 guide hydrogen gas to the anode electrode 52.

The first flow field member 42 has a circular hydrogen flow field member 68 and an annular hydrogen frame member 70. The hydrogen frame member 70 supports the hydrogen flow field member 68. A central portion of the hydrogen flow field member 68 has a hydrogen gas passage 32 (see FIG. 4). A surface of the hydrogen flow field member 68 facing the anode separator 38 (a surface in the direction of arrow A1) has a plurality of hydrogen gas flow field grooves 72, a hydrogen gas carrying-in concave portion 74, and a hydrogen gas carrying-out concave portion 76. The plurality of hydrogen gas flow field grooves 72 extend linearly. The hydrogen gas carrying-in concave portion 74 is connected to one end of the plurality of hydrogen gas flow field grooves 72. The hydrogen gas carrying-out concave portion 76 is connected to the other ends of the plurality of hydrogen gas flow field grooves 72.

The hydrogen gas flow field groove 72 does not communicate with the hydrogen gas passage 32 (see FIG. 4). The bottom surface of each hydrogen gas flow field groove 72 has a plurality of first through holes 78. The plurality of first through holes 78 guide the hydrogen gas flowing through the hydrogen gas flow field grooves 72 toward the MEA 36 (in the direction of arrow A2). The first through holes 78 are arranged at intervals in the extending direction of the hydrogen gas flow field groove 72.

In FIG. 4, a surface of the hydrogen frame member 70 facing the anode separator 38 (a surface in the direction of arrow A1) has a hydrogen gas carrying-in connection groove 80 and a hydrogen gas carrying-out connection groove 82. The hydrogen gas carrying-in connection groove 80 connects the hydrogen gas distribution flow field 26a (see FIG. 1) and the hydrogen gas carrying-in concave portion 74 with each other. The hydrogen gas carrying-out connection groove 82 guides the hydrogen gas in the hydrogen gas carrying-out concave portion 76 to the hydrogen gas collection flow field 26b (see FIG. 1). The hydrogen gas carrying-in connection groove 80 is located at a position shifted from the hydrogen gas carrying-out connection groove 82 by 180° in the circumferential direction of the hydrogen frame member 70. The hydrogen gas flow field 66 includes the hydrogen gas carrying-in connection groove 80, the hydrogen gas carrying-in concave portion 74, the hydrogen gas flow field groove 72, the first through hole 78, the hydrogen gas carrying-out concave portion 76, and the hydrogen gas carrying-out connection groove 82.

As shown in FIGS. 3 and 4, the second flow field member 44 has a water channel 84. The water channel 84 is located between the anode electrode 52 and the first flow field member 42. Liquid water (cooling water) for humidifying the hydrogen gas and cooling the electrolyte membrane 50 flows through the water channel 84.

The second flow field member 44 has a circular first water channel member 86, an annular first water frame member 88, a circular second water channel member 90, and an annular second water frame member 92. The first water frame member 88 supports the first water channel member 86. The second water frame member 92 supports the second water channel member 90. A central portion of the first water channel member 86 has a hydrogen gas passage 32 (see FIG. 4).

A surface of the first water channel member 86 on the side opposite to the anode separator 38 (in the direction of arrow A2) has a plurality of first water flow grooves 94a, a first water carrying-in concave portion 96a, and a first water carrying-out concave portion 98a. The plurality of first water flow grooves 94a extend linearly. The first water carrying-in concave portion 96a is connected to one end of the plurality of first water flow grooves 94a. The first water carrying-out concave portion 98a is connected to the other end of the plurality of first water flow grooves 94a. The plurality of first water flow grooves 94a extend in the width direction of the hydrogen gas flow field groove 72 (the direction orthogonal to the stacking direction and the extending direction of the hydrogen gas flow field groove 72).

The first water flow groove 94a does not communicate with the hydrogen gas passage 32 (see FIG. 4). The bottom surface of each first water flow groove 94a has a plurality of second through holes 100. The plurality of second through holes 100 guide the hydrogen gas flowing through the first through holes 78 in the direction of arrow A2. The plurality of second through holes 100 are arranged at intervals in the extending direction of the first water flow groove 94a. The plurality of second through holes 100 overlap the plurality of first through holes 78 when viewed from the stacking direction.

In FIG. 4, a surface of the first water frame member 88 on the side opposite to the anode separator 38 (in the direction of arrow A2) has a first water carrying-in connection groove 102a and a first water carrying-out connection groove 104a. The first water carrying-in connecting groove 102a communicates with the first water carrying-in concave portion 96a. The first water carrying-out connection groove 104a communicates with the first water carrying-out concave portion 98a. The first water carrying-in connection groove 102a is located at a position shifted by 180° from the first water carrying-out connecting groove 104a in the circumferential direction of the first water frame member 88.

As shown in FIGS. 3 and 4, the second water channel member 90 and the second water frame member 92 are positioned more toward the direction of arrow A2 than the first water channel member 86 and the first water frame member 88. The second water channel member 90 has a shape of the first water channel member 86 vertically inverted. The second water frame member 92 has a shape of the first water frame member 88 vertically inverted. That is, a central portion of the second water channel member 90 has a hydrogen gas passage 32 (see FIG. 4). The surface of the second water channel member 90 facing the anode separator 38 (the surface in the direction of arrow A1) has a plurality of second water flow grooves 94b, a second water carrying-in concave portion 96b, and a second water carrying-out concave portion 98b. The plurality of second water flow grooves 94b extend linearly. The second water carrying-in concave portion 96b is connected to one end of the plurality of second water flow grooves 94b. The second water carrying-out concave portion 98b is connected to the other end of the plurality of second water flow grooves 94b.

The plurality of second water flow grooves 94b extend along the extending direction of the first water flow grooves 94a. The plurality of second water flow grooves 94b overlap the plurality of first water flow grooves 94a when viewed from the stacking direction. In other words, the second water flow grooves 94b communicate with the first water flow grooves 94a in the stacking direction (the thickness direction of the second flow field member 44). In other words, the first water flow grooves 94a and the second water flow grooves 94b communicate with each other to form one water flow hole 94.

The second water flow grooves 94b do not communicate with the hydrogen gas passage 32 (see FIG. 4). The bottom surface of each second water flow groove 94b has a plurality of third through holes 106. The plurality of third through holes 106 guide the hydrogen gas and the water vapor flowing through the second through holes 100 in the direction of the arrow A2. The third through holes 106 are arranged at intervals in the extending direction of the second water flow groove 94b. The plurality of third through holes 106 overlap the plurality of second through holes 100 when viewed from the stacking direction.

The first water carrying-in concave portion 96a and the second water carrying-in concave portion 96b communicate with each other in the stacking direction (the thickness direction of the second flow field member 44). That is, the first water carrying-in concave portion 96*a* and the second water carrying-in concave portion 96*b* communicate with each other to form one water carrying-in hole 96.

The first water carrying-out concave portion 98*a* and the second water carrying-out concave portion 98*b* communicate with each other in the stacking direction (the thickness direction of the second flow field member 44). That is, the first water carrying-out concave portion 98*a* and the second water carrying-out concave portion 98*b* communicate with each other to form one water carrying-out hole 98.

In FIG. 4, a surface of the second water frame member 92 facing the anode separator 38 (a surface in the direction of arrow A1) has a second water carrying-in connection groove 102*b* and a second water carrying-out connection groove 104*b*. The second water carrying-in connecting groove 102*b* communicates with the second water carrying-in concave portion 96*b*. The second water carrying-out connection groove 104*b* communicates with the second water carrying-out concave portion 98*b*.

The first water carrying-in connection groove 102*a* and the second water carrying-in connection groove 102*b* communicate with each other in the stacking direction (the thickness direction of the second flow field member 44). In other words, the first water carrying-in connection groove 102*a* and the second water carrying-in connection groove 102*b* communicate with each other to form one water carrying-in connection hole 102. The water carrying-in connection hole 102 communicates with the water distribution flow field 30*a* (see FIG. 1).

The first water carrying-out connection groove 104*a* and the second water carrying-out connection groove 104*b* communicate with each other in the stacking direction (the thickness direction of the second flow field member 44). That is, the first water carrying-out connection groove 104*a* and the second water carrying-out connection groove 104*b* communicate with each other to form one water carrying-out connection hole 104. The water carrying-out connection hole 104 communicates with the water collection flow field 30*b*. The water channel 84 of the second flow field member 44 includes a water carrying-in connection hole 102, a water carrying-in hole 96, a water flow hole 94, a water carrying-out hole 98, and a water carrying-out connection hole 104.

In FIGS. 3 and 4, a gas flow blocking member 108 is attached to the first water carrying-out concave portion 98*a* and the second water carrying-out concave portion 98*b*. The gas flow blocking member 108 blocks the flow of hydrogen gas to the downstream side of the water channel 84 (water flow hole 94) and permits the flow of liquid water. The gas flow blocking member 108 is sandwiched by the first water channel member 86 and the second water channel member 90. As described above, since the gas flow blocking member 108 is attached to the first water carrying-out concave portion 98*a* and the second water carrying-out concave portion 98*b*, the gas flow blocking member 108 is prevented from being pushed by the liquid water to the downstream side of the water channel 84. The gas flow blocking member 108 is a porous body. The gas flow blocking member 108 is made of, for example, graphene oxide. However, the material of the gas flow blocking member 108 may be selected depending on cases.

The gas flow blocking member 108 is located on the downstream side of the water flow hole 94. In other words, the gas flow blocking member 108 is located in the vicinity of the downstream side of a third through hole 106 that is located at the most downstream side among the plurality of third through holes 106. However, the gas flow blocking member 108 may be located on the upstream side of the third through hole 106 that is located on the most downstream side among the plurality of third through holes 106. In other words, the gas flow blocking member 108 may be located at the water flow hole 94.

The first intermediate member 46 is located between the first flow field member 42 and the second flow field member 44. The first intermediate member 46 has a first porous member 110 having a circular shape and a first support frame member 112 having an annular shape. The first support frame member 112 supports the first porous member 110. A central portion of the first porous member 110 has a hydrogen gas passage 32 (see FIG. 4).

The first porous member 110 covers all the first through holes 78 in the direction of arrow A2. The first porous member 110 covers all the second through holes 100 from the direction of arrow A1. That is, the first porous member 110 is interposed between the first through holes 78 and the second through holes 100.

The first porous member 110 prevents liquid water from flowing in the thickness direction and allows hydrogen gas to flow in the thickness direction. That is, the first porous member 110 permits the flow of hydrogen gas from the hydrogen gas flow field 66 (first through hole 78) to the water channel 84 (second through hole 100), and prevents the flow of liquid water from the water channel 84 to the hydrogen gas flow field 66. The first porous member 110 has water repellency. The first porous member 110 is a membrane member made of, for example, polytetrafluoroethylene. However, the material of the first porous member 110 may be appropriately selected depending on cases.

The second intermediate member 48 is located between the anode electrode 52 and the second flow field member 44. The second intermediate member 48 is formed in the same manner as the first intermediate member 46. Specifically, the second intermediate member 48 has a circular second porous member 114 and an annular second support frame member 116. The second support frame member 116 supports the second porous member 114. A central portion of the second porous member 114 has a hydrogen gas passage 32 (see FIG. 4).

The second porous member 114 covers all the third through holes 106 in the direction of arrow A2. In other words, the second porous member 114 is interposed between the third through hole 106 and the anode current collector 58.

The thickness D2 of the second porous member 114 is greater than the thickness D1 of the first porous member 110. The second porous member 114 is elastically deformable in the thickness direction. That is, the second porous member 114 also functions as a cushion material in a case where the electrolyte membrane 50 expands in the thickness direction due to heat.

The second porous member 114 prevents liquid water from flowing in the thickness direction and allows hydrogen gas and water vapor to flow in the thickness direction. That is, the second porous member 114 permits the flow of hydrogen gas and water vapor from the water channel 84 (third through hole 106) to the anode current collector 58 (gas diffusion layer) and prevents the flow of liquid water from the water channel 84 (third through hole 106) to the anode current collector 58. The second porous member 114 has water repellency. The second porous member 114 is a membrane member made of, for example, polytetrafluoroethylene. However, the material of the second porous member 114 may be appropriately selected depending on cases.

The electrochemical hydrogen compressor 10 constructed in this manner operates as follows.

In FIGS. 1 and 2, liquid water (cooling water) and hydrogen gas are supplied to the electrochemical hydrogen compressor 10 from an external pipe (not shown). At the electrochemical hydrogen compressor 10, liquid water is introduced into each electrochemical cell 12 from the water inlet port 28a through the water distribution flow field 30a. At the electrochemical hydrogen compressor 10, hydrogen gas is introduced into each electrochemical cell 12 from the hydrogen gas inlet port 24a through the hydrogen gas distribution flow field 26a.

As shown in FIGS. 3 and 4, in the electrochemical cell 12, the liquid water flows through the water channel 84 (water carrying-in connection hole 102, water carrying-in hole 96, water flow hole 94, water carrying-out hole 98, and water carrying-out connection hole 104) of the second flow field member 44. Because the water channel 84 is partitioned with respect to the hydrogen gas flow field 66 by the first porous member 110, liquid water flowing through the water channel 84 does not flow into the hydrogen gas flow field 66.

Further, because the water channel 84 is partitioned with respect to the anode current collector 58 by the second porous member 114, the liquid water flowing through the water channel 84 does not flow into the anode current collector 58. Further, the liquid water flowing through the water channel 84 passes through the gas flow blocking member 108 in the downstream direction. In FIGS. 1 and 2, the liquid water flowing through the water channel 84 of the second flow field member 44 is collected by the water collection flow field 30b and carried out to an external pipe (not shown) through the water outlet port 28b. The liquid water carried out to the outside of the electrochemical hydrogen compressor 10 flows into the water inlet port 28a again and is reused.

On the other hand, as shown in FIGS. 3 and 4, in the electrochemical cell 12, the hydrogen gas flows through the hydrogen gas flow field 66 of the first flow field member 42 (the hydrogen gas carrying-in connection groove 80, the hydrogen gas carrying-in concave portion 74, the hydrogen gas flow field groove 72, the hydrogen gas carrying-out concave portion 76, and the hydrogen gas carrying-out connection groove 82). At this time, the hydrogen gas flowing through the hydrogen gas flow field groove 72 flows into the water channel 84 (water flow hole 94) via the first porous member 110. The hydrogen gas flowing into the water flow hole 94 is humidified by liquid water flowing through the water flow hole 94. The humidified hydrogen gas is supplied to the anode electrode 52 (anode electrode catalyst layer 56) through the second porous member 114. Thus, hydrogen gas containing water vapor is supplied to the anode electrode catalyst layer 56.

The hydrogen gas flowing through the water flow hole 94 does not flow more downstream than the gas flow blocking member 108 due the liquid water. Therefore, the hydrogen gas flowing through the water flow hole 94 is efficiently guided to the anode electrode 52.

In a case where a voltage is applied to the anode current collector 58 and the cathode current collector 62 by a power supply device (not shown), the supplied hydrogen gas is converted into protons (hydrogen ions) through electrochemical reactions at the anode electrode catalyst layer 56. Protons generated at the anode electrode catalyst layer 56 pass through the inside of the electrolyte membrane 50 and are guided to the cathode electrode catalyst layer 60. In the cathode electrode catalyst layer 60, protons derived from the electrolyte membrane 50 are converted into high-pressure hydrogen gas through electrochemical reactions. The high-pressure hydrogen gas generated at the cathode electrode catalyst layer 60 passes through the cathode current collector 62 and is guided to the carrying-out flow field 64. The high-pressure hydrogen gas guided into the carrying-out flow field 64 is carried out to an external pipe (not shown) through the hydrogen gas passage 32 and the carrying-out port 34 (see FIG. 1).

In FIG. 1, unreacted hydrogen gas (hydrogen gas not consumed at the anode electrode catalyst layer 56) flowing through the hydrogen gas flow field 66 of the first flow field member 42 is collected by the hydrogen gas collection flow field 26b. The unreacted hydrogen gas collected by the hydrogen gas collection flow field 26b is carried out to an external pipe (not shown) through the hydrogen gas outlet port 24b. The unreacted hydrogen gas (low pressure) carried out to the outside of the electrochemical hydrogen compressor 10 flows into the hydrogen gas inlet port 24a again and is reused.

This embodiment has the following effects.

According to this embodiment, the hydrogen gas supplied to the hydrogen gas flow field 66 of the electrochemical cell 12 is led to the water channel 84 through the first porous member 110 and humidified by the liquid water flowing through the water channel 84. The humidified hydrogen gas (hydrogen gas containing water vapor) is guided to the anode electrode 52 through the second porous member 114. That is, the hydrogen gas is humidified inside the electrochemical cell 12. Therefore, it is possible to suppress drying of the electrolyte membrane 50 caused by condensation (lack of moisture) in the pipe arranged outside the electrochemical hydrogen compressor 10.

Further, the electrolyte membrane 50 that generates heat during the operation of the electrochemical cell 12 can be cooled by liquid water in the water channel 84. Therefore, it is possible to avoid a situation where the temperature of the electrolyte membrane 50 becomes excessively high and thus the electrolyte membrane 50 dries. Further, as the temperature of the electrolyte membrane 50 increases, the temperature of the liquid water increases and the amount of evaporation (amount of water vapor) increases, whereby drying of the electrolyte membrane 50 can be effectively suppressed.

The first porous member 110 and the second porous member 114 have water repellency.

According to this configuration, it is possible to effectively suppress the liquid water flowing through the water channel 84 from passing through the first porous member 110 and the second porous member 114 in the thickness direction.

The second porous member 114 is elastically deformable in the stacking direction of the MEA 36.

According to this configuration, the second porous member 114 can effectively receive the variation of the load acting from the cathode electrode 54 toward the anode electrode 52 when the electrochemical hydrogen compressor 10 is pressurized or depressurized. Even when the electrolyte membrane 50 expands in the stacking direction due to heat, the second porous member 114 can function as a cushion material. This makes it possible to reduce the thickness of the anode current collector 58, the first flow field member 42, and the second flow field member 44. Further, when the cell stack 14 is formed by stacking a plurality of electrochemical cells 12, the second porous member 114 can absorb tolerance variations in the stacking direction. This makes it possible to set a wide dimensional tolerance in the stacking direction of the constituent members of the electrochemical cell 12, thereby reducing the number of manufacturing steps of the electrochemical hydrogen compressor 10.

The thickness D2 of the second porous member 114 in the stacking direction is larger than the thickness D1 of the first porous member 110 in the stacking direction.

According to such a configuration, the function of the second porous member 114 as a cushion material can be enhanced.

The water channel 84 is provided with a gas flow blocking member 108 that blocks the flow of hydrogen gas more toward the downstream side than the water channel 84 and permits the flow of liquid water.

According to such a configuration, since the hydrogen gas can be prevented from flowing more downstream than the water channel 84 by the liquid water, the humidified hydrogen gas flowing through the water channel 84 can be efficiently guided to the anode electrode 52.

The present invention is not limited to the above-described embodiments, and various configurations can be adopted without departing from the scope of the present invention.

The embodiment described above can be summarized in the following manner.

Disclosed is an electrochemical hydrogen compressor (10) comprising an electrochemical cell (12) including a membrane electrode assembly including an electrolyte membrane (50) capable of conducting a hydrogen ion, and an anode electrode (52) and a cathode electrode (54) sandwiching the electrolyte membrane, and an anode separator (38) and a cathode separator (40) arranged on both sides of the membrane electrode assembly, wherein hydrogen gas supplied to the anode electrode is pressurized electrochemically to generate at the cathode electrode hydrogen gas having a higher pressure than the hydrogen gas, the electrochemical cell further including: a first flow field member (42) that is located between the anode electrode and the anode separator and includes a hydrogen gas flow field that guides the hydrogen gas to the anode electrode; a second flow field member (44) that is located between the anode electrode and the first flow field member and includes a water channel through which liquid water for humidifying the hydrogen gas and cooling the electrolyte membrane flows; a first porous member (110) that is located between the first flow field member and the second flow field member; and a second porous member (114) that is located between the second flow field member and the anode electrode, wherein the first porous member permits flow of the hydrogen gas from the hydrogen gas flow field to the water channel and prevents flow of the liquid water, and the second porous member permits flow of the hydrogen gas and water vapor from the water channel and prevents flow of the liquid water.

In the electrochemical hydrogen compressor described above, the first porous member and the second porous member may have water repellency.

In the electrochemical hydrogen compressor described above, the first porous member and the second porous member may be made of polytetrafluoroethylene.

In the electrochemical hydrogen compressor described above, the second porous member may be elastically deformable in the stacking direction of the membrane electrode assembly.

In the electrochemical hydrogen compressor, the thickness of the second porous member in the stacking direction may be greater than the thickness of the first porous member in the stacking direction.

In the electrochemical hydrogen compressor, the water channel is provided with a gas flow blocking member (108) that blocks flow of the hydrogen gas to the downstream side of the water channel and permits flow of the liquid water.

In the electrochemical hydrogen compressor described above, the gas flow blocking member may be made of graphene oxide.

What is claimed is:

1. An electrochemical hydrogen compressor comprising an electrochemical cell including:
   a membrane electrode assembly including an electrolyte membrane capable of conducting a hydrogen ion, and an anode electrode and a cathode electrode sandwiching the electrolyte membrane; and
   an anode separator and a cathode separator arranged on both sides of the membrane electrode assembly,
   wherein hydrogen gas supplied to the anode electrode is pressurized electrochemically to generate at the cathode electrode hydrogen gas having a higher pressure than the hydrogen gas,
   the electrochemical cell further including:
   a first flow field member that is located between the anode electrode and the anode separator and includes a hydrogen gas flow field that guides the hydrogen gas to the anode electrode;
   a second flow field member that is located between the anode electrode and the first flow field member and includes a water channel through which liquid water for humidifying the hydrogen gas and cooling the electrolyte membrane flows;
   a first porous member that is located between the first flow field member and the second flow field member; and
   a second porous member that is located between the second flow field member and the anode electrode,
   wherein the first porous member permits flow of the hydrogen gas from the hydrogen gas flow field to the water channel and prevents flow of the liquid water, and
   the second porous member permits flow of the hydrogen gas and water vapor from the water channel and prevents flow of the liquid water.

2. The electrochemical hydrogen compressor according to claim 1, wherein
   the first porous member and the second porous member have water repellency.

3. The electrochemical hydrogen compressor according to claim 2, wherein
   the first porous member and the second porous member are made of polytetrafluoroethylene.

4. The electrochemical hydrogen compressor according to claim 1, wherein
   the second porous member is elastically deformable in the stacking direction of the membrane electrode assembly.

5. The electrochemical hydrogen compressor of claim 4, wherein:
   the thickness of the second porous member in the stacking direction is greater than the thickness of the first porous member in the stacking direction.

6. The electrochemical hydrogen compressor according to claim 1, wherein:
   the water channel is provided with a gas flow blocking member that blocks flow of the hydrogen gas to a downstream side of the water channel and permits flow of the liquid water.

7. The electrochemical hydrogen compressor of claim 6, wherein:
   the gas flow blocking member is made of graphene oxide.

* * * * *